H. J. WAGNER.
TREE HOLDER.
APPLICATION FILED NOV. 6, 1909.
952,655.  Patented Mar. 22, 1910.
2 SHEETS—SHEET 1.
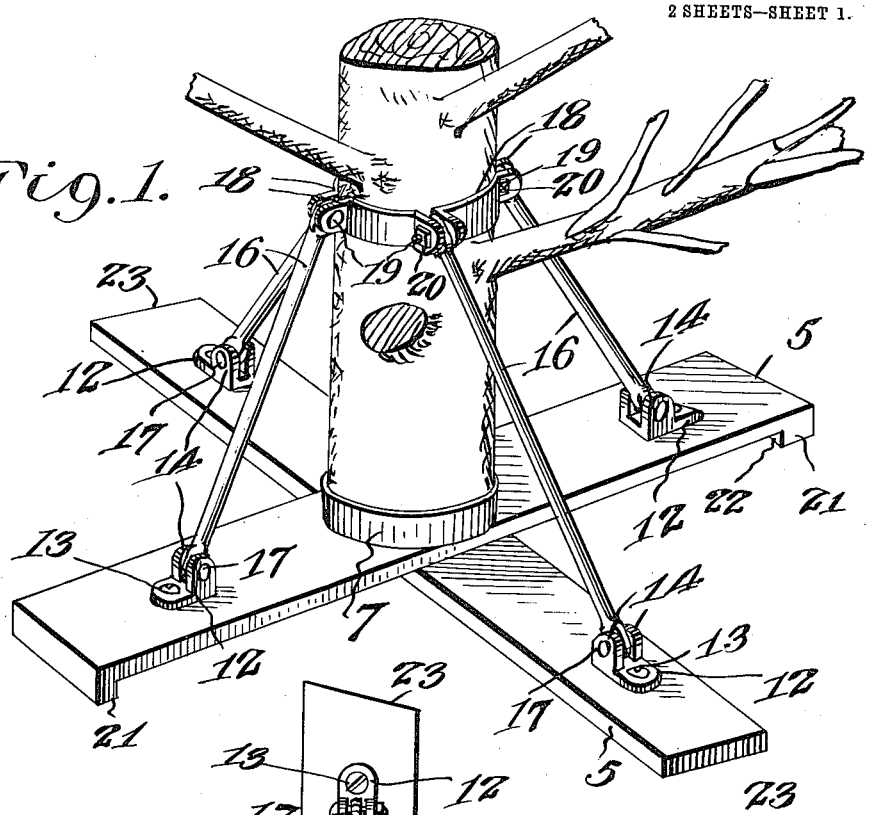
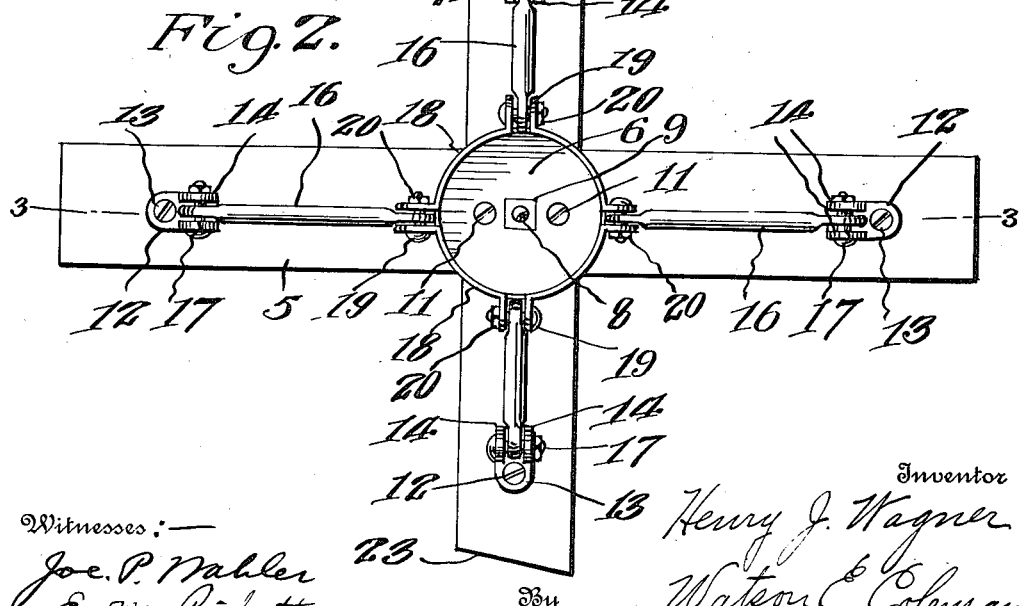
Witnesses:
Joe. P. Nahler
E. M. Ricketts
Inventor
Henry J. Wagner
By Watson E. Coleman
Attorney H. J. WAGNER.
TREE HOLDER.
APPLICATION FILED NOV. 6, 1909.
952,655.
Patented Mar. 22, 1910.
2 SHEETS—SHEET 2.
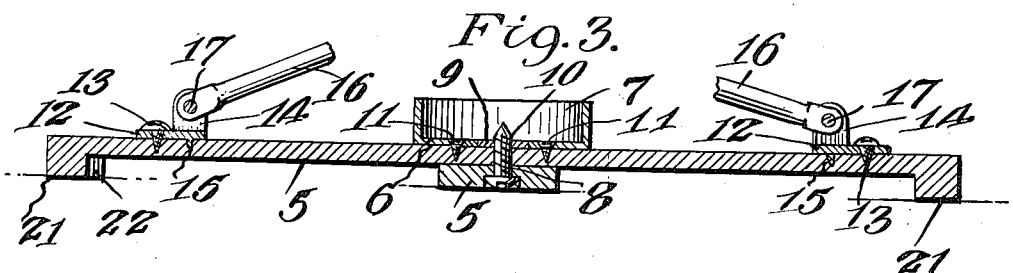
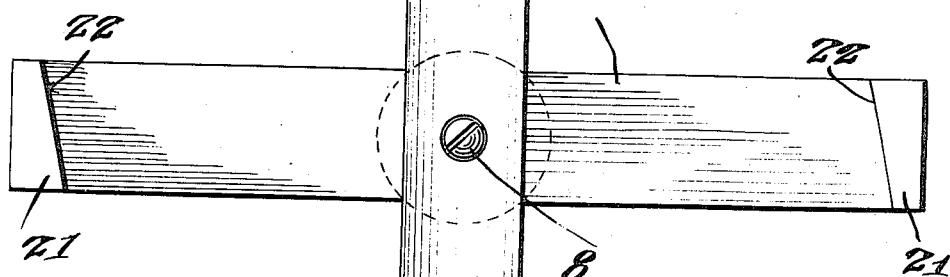
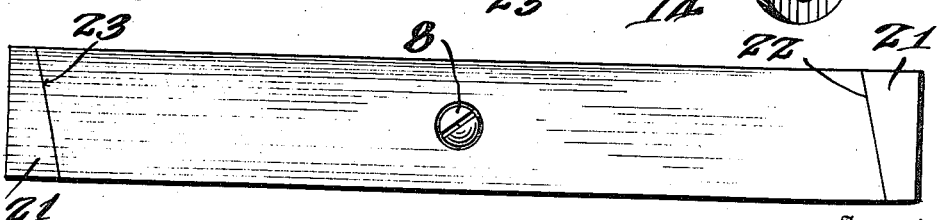
Witnesses:—
Joe. P. Wahler
E. M. Ricketts
Inventor
Henry J. Wagner
By Watson E. Coleman
Attorney

UNITED STATES PATENT OFFICE.

HENRY J. WAGNER, OF ROXBURY, MASSACHUSETTS.

TREE-HOLDER.

952,655.

Specification of Letters Patent. Patented Mar. 22, 1910.

Application filed November 6, 1909. Serial No. 526,628.

*To all whom it may concern:*

Be it known that I, HENRY J. WAGNER, a citizen of the United States, residing at Roxbury, in the county of Suffolk and State of Massachusetts, have invented certain new and useful Improvements in Tree-Holders, of which the following is a specification, reference being had to the accompanying drawings.

This invention has relation to certain new and useful improvements in tree holders, and more particularly to a device of this character which is adapted to support pine or spruce trees which are commonly used at Christmas time and are adapted to be trimmed or decorated.

Another object is to provide a device of this character which is of simple construction, may be compactly folded when not in use, and is adjustable whereby tree trunks of various diameters may be supported therein.

A further object is to provide a tree holder which is constructed of a few simply formed parts and is strong, rigid and durable in use.

With these and other objects in view, the invention consists of the novel construction, combination and arrangement of parts, hereinafter fully described and claimed, and illustrated in the accompanying drawings, in which—

Figure 1 is a perspective view illustrating the application of the tree holder; Fig. 2 is a top plan view, the tree being removed; Fig. 3 is a section taken on the line 3—3 of Fig. 2; Fig. 4 is a bottom plan view; Fig. 5 is a similar view showing the base bars folded, and Fig. 6 is a detail, inverted perspective view of one of the bearing members.

Referring to the drawings, 5 indicates two base bars disposed upon each other and extending at right angles. A metal plate 6 is formed with a circumscribing vertical flange 7 and is adapted to be secured to the upper bar 5 at the center thereof. A screw 8 is disposed through said base bars and has a nut 9 threaded upon its upper end which is countersunk in the plate 6. It will be noted that the screw projects above the nut and is pointed or conically formed, as shown at 10. The plate 5 is further secured rigidly upon the base bar by means of the screws 11. A bearing plate 12 is secured adjacent to the ends of each of the bars by means of the screw 13. These plates are formed at their inner ends with the spaced ears 14, and a spur 15 is integrally formed upon the bottom of the plates and is embedded in the wood of the bar 5, whereby the plates are securely held upon the bar against movement. One end of a supporting rod 16 is disposed between the ears 14 and a pintle in the form of a bolt 17 is disposed through said ears and through an aperture in the end of the rod. The rod has free pivoted movement and the screws 13 may be removed from the bearings 12 when the device is knocked down and folded, as will be later set forth.

A circular segmental holding ring is adapted to be positioned about the trunk of the tree. Each of the arcuate sections 18 of this holding ring is formed with an ear at each end. The ears of the adjacent ring sections are disposed upon opposite sides of the upper end of the supporting rod 16, and are pivotally connected thereto by means of the screws 19. These screws may be of any desired length and are provided with nuts 20 upon one end which are adapted to bind upon the ear of one of the arcuate ring sections and hold the same in frictional engagement upon the tree trunk. It will be obvious that these screws may be of any desired length whereby trees of various diameters may be positioned in the ring sections.

In order to compactly fold the device when not in use, the ends of the upper base bar 5 have secured thereto on the under side of the bar the transverse cleats 21, the inner edges of which are angularly disposed, as shown at 22. The other of the base bars 5 is adapted to be swung inwardly between these cleats and is provided with the angularly cut ends 23, which when in folded position are substantially parallel to the inclined ends of the cleats. By thus forming the base bars, they may be swung together upon each other without the ends thereof binding, and are securely held in their folded position by the engagement of the angular edges of the cleats and the ends of the bar. It will of course be understood that the bearing members which support the rods 16 at their lower ends are first removed and the rods and the ring sections may be securely tied together and packed away with the base until again required for use. It will also be noted that as the bars are swung together, the screw 8 is threaded through the same and draws the bars upon each other, so that when in folded position their separation is impossible, it being necessary to exert considerable strength to move the bars to their open positions.

In the operation of the holder, the tree is positioned within the annular vertical flange 7 of the base plates 6, and the spur 10 upon the end of the bolt 8 is forced into the bottom thereof, whereby the tree will be securely held from sliding movement within the flange. The ring sections are now disposed upon the periphery of the tree trunk, and the screws connecting the same with the supporting rods are adjusted until the ring is tightly bound upon the tree, thus securely supporting the same in its upright position. The base bars are of sufficient length to provide a very substantial and rigid base support.

While the holder is particularly adapted for supporting Christmas trees, it will be understood that flower pots may also be arranged between the ring sections and the projecting end of the bolt may be disposed through the opening formed in the bottom thereof.

From the foregoing it will be seen that I have provided a tree holder of very simple construction, which will at all times support the tree rigidly in position so that the same may be readily trimmed or decorated.

While I have shown and described what I believe to be the preferred embodiment of the invention, it will be obvious that numerous minor changes may be made in the form, proportions and minor details of construction without departing from the spirit or sacrificing any of the advantages of the same.

Having thus described the invention what is claimed is:

In a device of the character described, the combination of a base comprising two pivoted bars adapted to be folded upon each other, one of said bars having cleats secured to its under side at each end, said cleats having angular inner edges, the ends of the other of said bars being angularly cut and adapted to be disposed between the angular inner edges of said cleats when in folded position, said bars being angularly arranged upon each other in operative position, a bearing plate secured to each of the bars adjacent to its ends having spaced ears formed thereon, a circular plate secured centrally upon the bars having a vertical circumscribing flange, the pivot pin of said bars extending above said plate and having its end conically formed, a supporting rod pivotally mounted between the ears of said bearing plate and extending upwardly and inwardly therefrom, a holding ring formed in a plurality of arcuate sections, the ends of adjacent sections being disposed upon opposite sides of the upper end of each of the supporting rods, adjusting screws extending through the ends of said ring sections and the rods, nuts threaded upon the ends of the screws to secure the sections in their adjusted positions, said supporting rods and ring sections being removable from the base bars.

In testimony whereof I hereunto affix my signature in the presence of two witnesses.

HENRY J. WAGNER.

Witnesses:
EDWARD J. FEIN,
THOMAS GERHARD.